United States Patent

Utton

[15] 3,640,364
[45] Feb. 8, 1972

[54] CLUTCH BEARING WITH MAGNETIC SUPPORT

[72] Inventor: Norman Utton, Leamington Spa, England
[73] Assignee: Automotive Products Company Limited, Leamington Spa, England
[22] Filed: Dec. 4, 1969
[21] Appl. No.: 881,993

[30] Foreign Application Priority Data

Dec. 9, 1968 Great Britain...................58,339/68

[52] U.S. Cl. ............................192/98, 192/84 PM, 308/236
[51] Int. Cl.........................................................F16d 23/14
[58] Field of Search............................192/110 B, 98, 84 PM

[56] References Cited

UNITED STATES PATENTS

| | | | |
|---|---|---|---|
| 2,624,435 | 1/1953 | Stephenson | 192/84 PM |
| 2,962,142 | 11/1960 | Straub | 192/98 X |
| 3,333,664 | 8/1967 | Chapaitis | 192/98 |
| 3,416,637 | 12/1968 | Maurice | 192/98 |

*Primary Examiner*—Benjamin W. Wyche
*Attorney*—L. J. Winter

[57] ABSTRACT

One race (25) of a release bearing (21) of a friction clutch release mechanism acts on the fingers (19) of a diaphragm spring (14) and the other race (27) is mounted on a bush (28) which surrounds a fixed sleeve (23) of nonmagnetic material with a clearance (29) therebetween. The bush (28) has a radial flange which affords an armature for cooperation with a permanent magnet (32) carried by a carrier (22) which is slidably mounted on the sleeve (23). The permanent magnet (32) may be a ring magnet or a circumferentially spaced array of separate magnets and the face of the or each magnet may be flush with the surrounding face of the carrier. In use of the friction clutch release mechanism, if the clutch and the fixed guide are not coaxial, the permanent magnet (32) permits the release bearing (21) to move radially relative to the carrier (22) into a position in which it is concentric with the clutch, and holds the release bearing (21) concentric with the clutch.

8 Claims, 3 Drawing Figures

PATENTED FEB 8 1972

3,640,364

INVENTOR
Norman Ytton
BY Lawrence Horcnter
ATTORNEY

CLUTCH BEARING WITH MAGNETIC SUPPORT

This invention relates to a clutch release mechanism including a release bearing guided for axial movement relative to a clutch and adapted to act directly, or through a release lever plate, on the radially inner ends of clutch release levers, or of radially inwardly extending fingers of a diaphragm spring providing the clutch-engaging load, in order to release the clutch-engaging load.

To provide accurate concentricity between the axial guiding means for the release bearing and the clutch itself would be a very difficult matter, but it is undesirable that the surface of the release bearing which contacts the release levers, fingers or release lever plate should be eccentric with respect to the clutch axis, because such eccentricity accelerates wear of the contacting surfaces.

A clutch release mechanism including a carrier member slidably mounted on fixed guiding means for axial movement relative to a clutch and supporting a release bearing which is movable relative to the carrier member in a plane normal to the clutch axis and which is restrained against movement in that plane by a friction grip device, could be employed in order to permit correct centering of the release bearing with respect to the clutch axis while allowing for eccentric positioning of the fixed guiding means with respect to the clutch axis. In such an arrangement, the axis of the release bearing will tend to align itself initially with the clutch axis to be held in that position by the friction device. However, the magnitude of the restraining load applied to the release bearing by such a friction grip device is critical in that it must be sufficient to restrain the release against transverse movement induced by the centrifugal effect of out of balance forces without being so great as to inhibit the necessary movement in the transverse direction which enables the bearing to function as a self-centering bearing. Factors effecting the critical restraining load include wear of the cooperating surfaces of the release bearing and the friction grip device, and variations in the axial load applied to the release bearing by the friction grip device.

It is the object of the present invention to provide means for enabling the release bearing to take up, and maintain a position concentric with the clutch axis in which the influence of wear and axial load variation on the critical restraining load is less than is the case with restraining means including a friction grip device.

According to one aspect of this invention a clutch release bearing includes a carrier member slidable on a fixed guide for axial movement relative to a clutch and supporting a release bearing which is movable relative to the carrier member in a plane normal to the clutch axis, part of the release bearing being adapted to act directly, or through a release lever plate, on the radially inner ends of clutch release levers, or of radially inwardly extending fingers of a diaphragm spring providing a clutch-engaging load, in order to release the clutch-engaging load, and restraining means acting on the release bearing to resist such movement of the release bearing relative to the carrier member, wherein the restraining means comprises magnetic means.

The influence of wear of the cooperating surfaces of the restraining means and the release bearing on the critical restraining load is less with magnetic restraining means than with restraining means of the friction-grip type because magnetic material is less prone to wear than is friction material. Furthermore magnetic restraining means do not require an axial load-applying member, such as a Belleville spring washer, which serves to hold the cooperating surfaces of the release bearing and a friction grip device in engagement with each other. The axial load applied to such a release bearing tends to compress the friction material employed in such a friction grip device and thus tends to accelerate the wear of such friction material. Moreover, where the axial load applying member is a Belleville spring washer, the axial load applied to the release bearing to hold it in engagement with the friction grip device varies during operation of the clutch release mechanism due to the variation of the load applied by a Belleville spring washer with deflection thereof, such axial load variation being accompanied by corresponding variation in the critical restraining load. Use of a magnetic restraining means does not result in such variations of the axial load applied to hold the restraining means in engagement with the release bearing.

Preferably the fixed guide is formed of a nonmagnetic material. Conveniently the magnetic means includes a permanent magnet which may be mounted on the carrier member and arranged to cooperate magnetically with an armature afforded by the release bearing or by a component secured thereto. Alternatively the permanent magnet may be mounted on the release bearing, or upon a component secured thereto, and may be arranged to cooperate with an armature carried by the carrier member. The permanent magnet may be a ring magnet or may be one of a number of circumferentially spaced permanent magnets. The magnet surface which cooperates with the armature may be flush with a surface of the carrier member or the release bearing surrounding the magnet surface.

According to another aspect of this invention a clutch release mechanism includes a carrier member slidable on a fixed guide for axial movement relative to a clutch and supporting a ball thrust bearing which is movable relative to the carrier member in a plane normal to the clutch axis, one race of the ball-thrust bearing being adapted to act directly, or through a release lever plate, on the radially inner ends of clutch release levers, or of radially inwardly extending fingers of a diaphragm spring providing the clutch-engaging load, in order to release the clutch-engaging load, and restraining means acting on the other race of the release bearing to resist such movement of the release bearing relative to the carrier member, wherein the restraining means acts on an annular surface of the other race, or of a member secured to said other race, which annular surface extends radially alongside said one race, so that the cross-sectional area of said surface is greater than the cross-sectional area of said other race measured radially in the region of the balls of the bearing.

The critical restraining load may be applied over a greater cross-sectional area in a clutch release mechanism in accordance with this aspect of the invention than in a similarly dimensional clutch release mechanism in which the cross-sectional area of the annular surface to which the critical restraining load is applied is no greater than the cross-sectional area of said other race, with the result the rate of wear of the cooperating surfaces is reduced.

Preferably the restraining means of a clutch release mechanism in accordance with this aspect of the invention comprises magnetic means.

Two embodiments of this invention will now be described by way of example only with reference to the accompanying drawings, of which:

Figure 1:
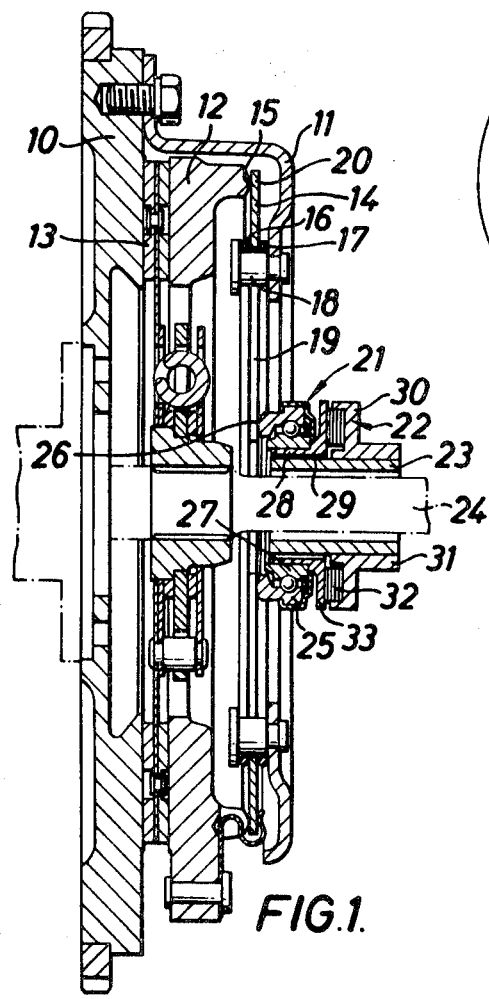
FIG. 1 is a longitudinal sectional elevation of a clutch incorporating one embodiment of a clutch release mechanism in accordance with this invention.

Referring to FIG. 1, the clutch comprises a flywheel 10 to the peripheral part of which is secured a cover plate 11. A pressure plate 12 is mounted within the space defined between the flywheel 10 and the cover plate 11 and is coupled to the flywheel 10 and cover plate 11 for rotation therewith. A driven plate 13 is mounted between the flywheel 10 and the pressure plate 12. A diaphragm spring 14 acts at its outer periphery on a circumferential rib 15 formed on the pressure plate 12 and is located axially with respect to the cover plate 11 by two rings 16 and 17, one on each side of the spring 14. The two rings 16 and 17 are located radially by studs 18 fixed in the cover plate 11. The diaphragm spring 14 is formed with radial fingers 19 extending inwardly from a circumferentially continuous outer portion 20 thereof, but is initially of conical shape, being somewhat flattened when the clutch is assembled so that it provides an engaging load urging the pressure plate 12 towards the flywheel 10 to clamp the driven plate 13 therebetween.

It will be apparent that a thrust applied to the radially inner ends of the fingers 19 will cause the diaphragm spring 14 to be deflected about a fulcrum afforded by the rings 16 and 17 to withdraw the engaging load from the pressure plate 12 and release the clutch.

A clutch release mechanism for applying the releasing thrust to the fingers 19 comprises a release bearing 21 supported on a carrier member 22. The carrier member 22 is slidable in the direction of the clutch axis on a sleeve 23 formed of nonmagnetic material and surrounding a driven shaft 24 which carries the clutch driven plate 13. The release bearing 21 is a ball-thrust bearing. One race 25 of the ball-thrust release bearing 21, has an annular surface 26 which is arranged to engage the fingers 19, and the other race 27 is mounted rigidly on a bush 28 surrounding the sleeve 23. Normally a radial clearance 29 is defined between the bush 28 and the sleeve 23.

The carrier member 22 is a ring including a radial flange 30 and a tubular portion 31 which is a sliding fit on the sleeve 23. A ring-shaped permanent magnet 32 is fixed on the flange 30. The bush 28 has an annular flange 33 of magnetic material which extends radially alongside both races of the release bearing 21, faces the magnet 32 and is held in contact with the magnet 32 by the attractive magnetic force thereof. Thus the release bearing 21 is supported magnetically on the carrier member 22 in a manner which allows it to move relative to the carrier member 22 in a plane normal to the clutch axis. Consequently, although the sleeve 23, which guides the release bearing 21 for axial movement, may not be coaxial with the clutch, the release bearing 21 can take up a position coaxial with the clutch thus avoiding continual relative movement during clutch disengagement between the release bearing 21 and the diaphragm spring fingers 19, and thereby reducing the wear of those parts. It will be understood that the pressure exerted between the annular flange 33 and the ring magnet 32 and in consequence the rate of wear of the cooperating surfaces thereof is less than would be the case if the total restraining load was applied by the ring magnet 32 to the radially inner race 27 of the release bearing 21, because the cross-sectional area of the race 27 measured radially is less than the cross-sectional area of the annular surface afforded by the annular flange 33. The use of a nonmagnetic material for the sleeve 23 eliminates the possibility that the field of the magnet 32 may cause attraction between the sleeve 23 and the bush 28, which, if the sleeve 23 and the bush 28 come into contact, might be sufficient to prevent the bush 28 from moving to another position relative to the sleeve 23. The carrier member 22 may be coupled to a pedal or other clutch release control in any desired manner, for example by a mechanical linkage or by a fluid-pressure system.

Figure 2:
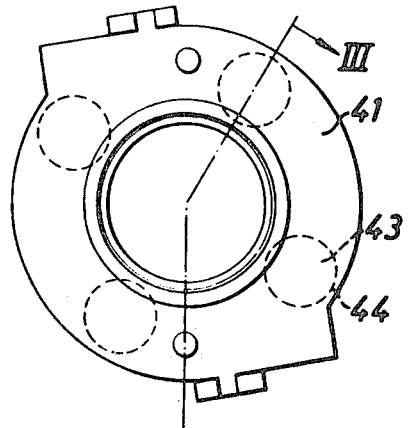
FIG. 2 is an end view of a clutch release mechanism in accordance with a second embodiment of this invention.
Figure 3:
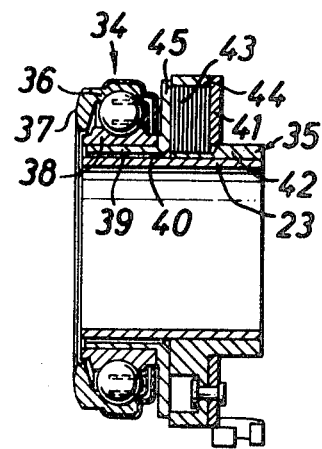
FIG. 3 is a section on the line III—III of FIG. 2.

Referring to FIGS. 2 and 3, there is illustrated an alternative form of clutch release mechanism which may be used in place of the clutch release mechanism described above for use in the clutch illustrated in FIG. 1. The clutch release mechanism illustrated in FIGS. 2 and 3 comprises a release bearing 34 supported on a carrier member 35 which is slidable in the direction of the clutch axis on the sleeve 23. The release bearing 34 is a ball-thrust bearing. One race 36 of the ball-thrust release bearing 34 has an annular surface 37 which is arranged to engage the fingers 19, and the other race 38 is mounted rigidly on a bush 39 surrounding the sleeve 23. Normally a radial clearance 40 is defined between the bush 39 and the sleeve 23.

The carrier member 35 is a ring including a radial flange 41 and a tubular portion 42 which is a sliding fit on the sleeve 23. Four circumferentially spaced cylindrical magnets 43 are each located in a corresponding cylindrical hole 44 formed in the radial flange 41. The four magnets 43 are all polarized so that like poles are nearer to the release bearing 34. The ends of the magnets 43 nearer the release bearing 34 are flush with the radial face of the flange 41. The flange 41 is made of a hard-wearing material, such as a tool steel, and the sleeve 23 may be made of a suitable nonmagnetic material such as an aluminum alloy. The bush 39 has a flange 45 of magnetic material which faces the magnets 43 and is held in contact therewith by the attractive magnetic force thereof.

The operation of the clutch release mechanism of this embodiment of the invention is substantially the same as that described above with reference to and as illustrated in FIG. 1.

It will be understood that the clutch release mechanisms hereinbefore described may be used with a friction clutch having radial release levers to transmit the releasing effort to the pressure plate and that the release bearing, instead of acting directly on the release levers or diaphragm spring levers may act on a thrust ring to which the inner ends of the release levers or diaphragm spring fingers are connected.

Various other modifications or refinements of the embodiments of the invention described above may be incorporated without departing from the scope of this invention. For example, the inner race of the release bearing 21 or 34 may be integral with the radially outwardly projecting flange 33 or 45 instead of being mounted on the bush 28 or 39 which incorporates that flange 33 or 45. The annular ring magnet 32 may be flush with the surface of the flange 30 instead of projecting axially therefrom towards the radial flange 33 as illustrated in FIG. 1. The or each magnet 32 or 43 may be mounted in the radial flange 33 or 45, instead of in the carrier member 22 or 35, so as to cooperate with an armature afforded by the cooperating surface of the carrier member 22 or 35. The clutch release mechanism may incorporate electromagnetic restraining means in place of the permanent magnets described.

I claim:

1. A clutch release mechanism comprising a fixed tubular guide, a carrier member slidably disposed on said guide for axial movement therealong and relative to a clutch, a release bearing carried by said carrier member and having an inner bushing in spaced relationship with the outer surface of said tubular fixed guide to permit radial movement of said bearing with respect to said guide and said carrier member, a clutch-engaging, load-applying means, said bearing being disposed to contact said load-applying means to release said load-applying means from a clutch, said bearing including a magnet, and said carrier means including a magnet in contact with said bearing magnet to support magnetically said bearing.

2. The device of claim 1 wherein said bearing magnet is an annular flange and said carrier magnet is a ring.

3. A clutch release mechanism comprising a carrier member with a fixed guide supporting said carrier member for axially slidably movement relative to a clutch; a release bearing secured to said carrier member for movement relative to said carrier member in a plane normal to the clutch axis; a part of the release bearing adapted to act on clutch-engaging, load-applying means to release the clutch-engaging load, said bearing being secured to said carrier member by magnetic bearing means including a permanent magnet mounted on the carrier member and a magnet armature on said bearing.

4. A clutch release mechanism according to claim 3, wherein the surface of the permanent magnet, which cooperates with the armature, is flush with a surface of the carrier member surrounding said magnet surface.

5. A clutch release mechanism according to claim 4, wherein the surface of the magnet which cooperates with the armature is flush with a surface of the release bearing surrounding said magnet surface.

6. A clutch release mechanism of claim 3, wherein the permanent magnet is a ring magnet.

7. A clutch release mechanism of claim 3, wherein the magnet includes a number of circumferentially spaced permanent magnets.

8. A clutch release mechanism including a carrier member; a fixed guide supporting said carrier member for sliding movement axially relative to a clutch; a ball-thrust bearing having two coaxial races spaced apart by ball bearings; the ball-thrust bearing being magnetically secured to the carrier member for movement relative to said carrier member in a plane normal to the clutch axis, one race of the ball-thrust bearing being adapted to act on clutch-engaging, load-applying means to release the clutch-engaging load; and restraining means comprising magnets acting on the other race of the ball-thrust bearing to resist such movement of the ball-thrust bearing relative to the carrier member; wherein the improvement comprises the restraining means acting on an annular surface of said other race which extends radially alongside said one race so that the cross-sectional area of said annular surface is greater than the cross-sectional area of said other race measured radially in the region of the ball bearings.

* * * * *